United States Patent
Edwards et al.

(10) Patent No.: US 9,729,709 B1
(45) Date of Patent: *Aug. 8, 2017

(54) LOCATION-BASED SERVICES FOR CONTROLLED-ENVIRONMENT FACILITIES

(71) Applicant: Securus Technologies, Inc., Dallas, TX (US)

(72) Inventors: Adam C. Edwards, Fort Worth, TX (US); Russell W. Roberts, Colleyville, TX (US)

(73) Assignee: Securus Technologies, Inc., Carrollton, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/243,593

(22) Filed: Aug. 22, 2016

Related U.S. Application Data (63) Continuation of application No. 13/566,687, filed on Aug. 3, 2012, now Pat. No. 9,426,303.

(51) Int. Cl.
*H04W 24/00* (2009.01)
*H04M 3/42* (2006.01)
*H04W 4/02* (2009.01)
*H04W 4/04* (2009.01)

(52) U.S. Cl.
CPC ....... *H04M 3/42357* (2013.01); *H04W 4/021* (2013.01); *H04M 2242/14* (2013.01); *H04W 4/04* (2013.01)

(58) Field of Classification Search
CPC .............................. H04M 11/00; H04M 4/021
USPC .............................................. 455/456.1–457
See application file for complete search history.

(56) References Cited

U.S. PATENT DOCUMENTS

| | | | |
|---|---|---|---|
| 7,447,194 B1* | 11/2008 | Schlesener | H04L 65/1043 370/352 |
| 2009/0304167 A1* | 12/2009 | Wright | H04M 3/436 379/142.05 |
| 2011/0206038 A1* | 8/2011 | Hodge | H04M 3/2281 370/352 |
| 2011/0293082 A1* | 12/2011 | Gauri | H04M 1/72577 379/142.02 |
| 2012/0195234 A1* | 8/2012 | Cai | H04L 12/5855 370/259 |

* cited by examiner

*Primary Examiner* — Shahriar Behnamian
(74) *Attorney, Agent, or Firm* — Fogarty LLP (57) ABSTRACT

Systems and methods for developing, deploying, providing, and/or operating location-based services for controlled-environment facilities are disclosed. In some embodiments, a method may include receiving, from a resident of a controlled-environment facility, a request to establish a remote communication with a mobile device operated by a non-resident of the controlled-environment facility. The method may also include allowing or denying the request depending, at least in part, upon a physical location of the mobile device at the time of the request to establish the remote communication and subsequent monitoring during the allowed communication. The method may also include terminating an allowed remote communication based on the monitored location of the mobile device during the remote communication. In some cases, the method may also include comparing an indication of the physical location with a geofencing rule and taking a predetermined action in response to the comparison.

20 Claims, 8 Drawing Sheets

LOCATION-BASED SERVICES FOR CONTROLLED-ENVIRONMENT FACILITIES

CROSS-REFERENCE TO RELATED APPLICATIONS

This is a continuation of co-pending, commonly assigned, U.S. patent application Ser. No. 13/566,687, also entitled "Location-Based Services for Controlled-Environment Facilities" filed on Aug. 3, 2012, the disclosure of which is hereby incorporated herein by reference.

TECHNICAL FIELD

This specification relates generally to controlled-environment facilities, and, more particularly, to location-based services for controlled-environment facilities.

BACKGROUND

Cellular phones are becoming the only home phones in an increasing number of U.S. households, a trend intensified by challenging economic conditions. The percentage of "wireless-only" phone use continues to grow on a national level. For example, a recent report found that 17.5% of U.S. homes had only wireless telephones during the first half of 2008—nearly 3 percentage points greater than the estimate for 2007 (14.7%). The percentage of adults using only wireless phones also grew from 13.6% in 2007 to 16.1% in the first half of 2008. More than one in four U.S. homes, or 26.6%, had only a wireless phone as of June 2010, up from 13.6% in 2007. In fact, the percentage of wireless-only homes increased in every state, ranging from 35.2% in Arkansas to 12.8% in Rhode Island and New Jersey.

As the inventors hereof have recognized, however, numerous correctional facilities do not allow inmates to place calls to cell phones. Hundreds of thousands of call attempts to cell phones are blocked every month due to policies that do not allow such calls. Moreover, when mobile calls are in fact allowed, these correctional facilities typically require the called party to go through a registration process, open an account, provide billing name and address, as well as a phone bill or the like.

The inventors hereof have also recognized that these policies have been implemented, at least in part, due to security concerns. Even at facilities requiring a cell phone registration procedure, similar concerns remain. For example, when the called party is operating a wireless device, the facility's administration does not generally know where that party is physically located. Many escapes occur each year as a result of an inmate coordinating with an outside accomplice on their cell phone. In addition, drugs or other paraphernalia may be smuggled into correctional facilities when an inmate calls someone on their cell phone who is waiting in the facility's parking lot, the inmate is using the phone in the recreation yard, and the accomplice on the outside throws the drugs or the like over the fence.

SUMMARY

Embodiments disclosed herein are directed to systems and methods for developing, deploying, providing, and/or operating location-based services for controlled-environment facilities. In an illustrative, non-limiting embodiment, a method may include receiving, from a resident of a controlled-environment facility, a request to establish a remote communication with a mobile device operated by a non-resident of the controlled-environment facility, and allowing or denying the request depending, at least in part, upon a physical location of the mobile device. For example, the remote communication may be a telephone call, the mobile device may be a mobile phone, and the physical location may include a cell or sector identification. Additionally or alternatively, the remote communication may be a Voice-over-Internet Protocol (IP) (VoIP) call, the mobile device may be a mobile computing device, and the physical location may include an Internet Protocol (IP) address. Additionally or alternatively, the physical location may include latitude and longitude information.

In some implementations, the method may include storing an indication of the physical location in a call detail record (CDR). The method may also include displaying a representation of the physical location on a geographic map. The method may further include retrieving a geo-fencing rule, comparing the physical location with the geo-fencing rule, and causing an alert to be issued or denying the request in response to the physical location violating the geo-fencing rule.

The method may include retrieving another indication of another physical location of the mobile device during or prior to termination of the remote communication, the other physical location different from the physical location, and determining whether to allow the remote communication to continue based, at least in part, upon the other physical location. Additionally or alternatively, the method may include retrieving another indication of another physical location of the mobile device during or prior to termination of the remote communication, wherein the other physical location is different from the physical location, and causing an alert to be issued in response to the other physical location violating the geo-fencing rule.

In some embodiments, the method may include allowing or denying the request depending, at least in part, upon whether the non-resident has previously provided an authorization to disclose the physical location of the mobile device to the controlled-environment facility. In some cases, in response to the non-resident having previously provided the authorization, the method may include allowing the request, retrieving an indication of the physical location of the mobile device prior to or upon initiation of the remote communication, and storing the indication in a CDR. In response to the non-resident not having previously provided the authorization, the method may include allowing the non-resident to provide the authorization. Moreover, after allowing the non-resident to provide the authorization, the method may include, in response to the non-resident providing the authorization, allowing the request, retrieving an indication of the physical location of the mobile device, and storing the indication in the CDR, or, in response to the non-resident not providing the authorization, denying the request.

In other embodiments, the first physical location may be outside of an area code associated with the mobile device, and the method may further include billing the remote communication based, at least in part, upon the physical location.

In another illustrative, non-limiting embodiment, a system may include at least one processor and a memory coupled to the at least one processor, the memory configured to store program instructions executable by the at least one processor to cause the system to receive, from an inmate in a correctional facility, a request to establish a remote communication with a device operated by a non-resident of the correctional facility. The system may also determine that the device is a mobile device and receive an indication of the physical location of the mobile device upon establishment or during progress of the remote communication.

In some implementations, the system may retrieve a geo-fencing rule, the geo-fencing rule defining at least one of: (a) a geographical area from or to which the remote communication is allowed, or (b) a geographical area from or to which the remote communication is not allowed. The system may also evaluate whether to allow the establishment or progress of the remote communication based, at least in part, upon a comparison between the indication of the physical location and the geo-fencing rule. The system may receive a first indication of a first physical location of the mobile device upon establishment of the remote communication, wherein the first physical location does not violate the geo-fencing rule, receive a second indication of a second physical location of the mobile device during progress of the remote communication, wherein the second physical location violates the geo-fencing rule, and take a corrective action in response to the second indication. For example, the system may terminate the remote communication, record or monitor an audio of the remote communication, or issue an alert to a law enforcement entity.

In yet another illustrative, non-limiting embodiments, a tangible computer-readable storage medium may have program instructions stored thereon that, upon execution by a processor, cause the processor to receive an instruction to determine a physical location of a mobile device operated by a non-resident of a controlled-environment facility, the instruction having been issued, at least in part, in response to a request from a resident of the controlled-environment facility to establish a remote communication with the non-resident via the mobile device, determine the physical location of the mobile device, and generate physical location information corresponding to the physical location.

To determine the physical location of the mobile device, the processor may query a communication service provider serving the non-resident for the physical location, the physical location including at least one of: a cell identification, a sector identification, or an IP address. Additionally or alternatively, the processor may query a global positioning system (GPS) for the physical location, the physical location indication including a latitude and a longitude. For example, the physical location information may include a Zone Improvement Plan (ZIP) code corresponding to the physical location. Also, the physical location information may include a margin of uncertainty associated with the physical location.

In various embodiments, one or more of the techniques described herein may be performed by one or more computer systems. In other various embodiments, a tangible computer-readable storage medium may have program instructions stored thereon that, upon execution by one or more computer systems, cause the one or more computer systems to execute one or more operations disclosed herein. In yet other various embodiments, a system may include at least one processor and memory coupled to the at least one processor, the memory configured to store program instructions executable by the at least one processor to cause the system to execute one or more operations disclosed herein.

BRIEF DESCRIPTION OF THE DRAWINGS

Reference will now be made to the accompanying drawings.

FIGS. 8-11 are rendered screenshots of an LBS software application according to some embodiments.

While this specification provides several embodiments and illustrative drawings, a person of ordinary skill in the art will recognize that the present specification is not limited only to the embodiments or drawings described. It should be understood that the drawings and detailed description are not intended to limit the specification to the particular form disclosed, but, on the contrary, the intention is to cover all modifications, equivalents and alternatives falling within the spirit and scope of the claims. Also, any headings used herein are for organizational purposes only and are not intended to limit the scope of the description. As used herein, the word "may" is meant to convey a permissive sense (i.e., meaning "having the potential to"), rather than a mandatory sense (i.e., meaning "must"). Similarly, the words "include," "including," and "includes" mean "including, but not limited to."

DETAILED DESCRIPTION

This specification discloses systems and methods for developing, deploying, providing, and/or operating location-based services. Generally speaking, the various techniques described herein may find applicability in a wide variety of controlled-environment facilities. Examples of controlled-environment facilities may include correctional institutions or facilities (e.g., municipal jails, county jails, state prisons, federal prisons, military stockades, juvenile facilities, detention camps, home incarceration environments, etc.), healthcare facilities (e.g., hospitals, nursing homes, mental health facilities, rehabilitation clinics, such as drug and alcohol rehabilitation facilities, etc.), restricted living quarters (e.g., hotels, resorts, camps, dormitories, barracks, etc.), and the like. For convenience of explanation, various examples discussed herein are presented in the context of correctional facilities. For instance, in some of the embodiments discussed below, a controlled-environment facility may be referred to as a jail or prison, and its residents may be referred to as residents, arrestees, detainees, or inmates. It should be understood, however, that the systems and methods described herein may be similarly applicable to other types of controlled-environment facilities and their respective residents (e.g., a hospital and its patients).

Figure 1:
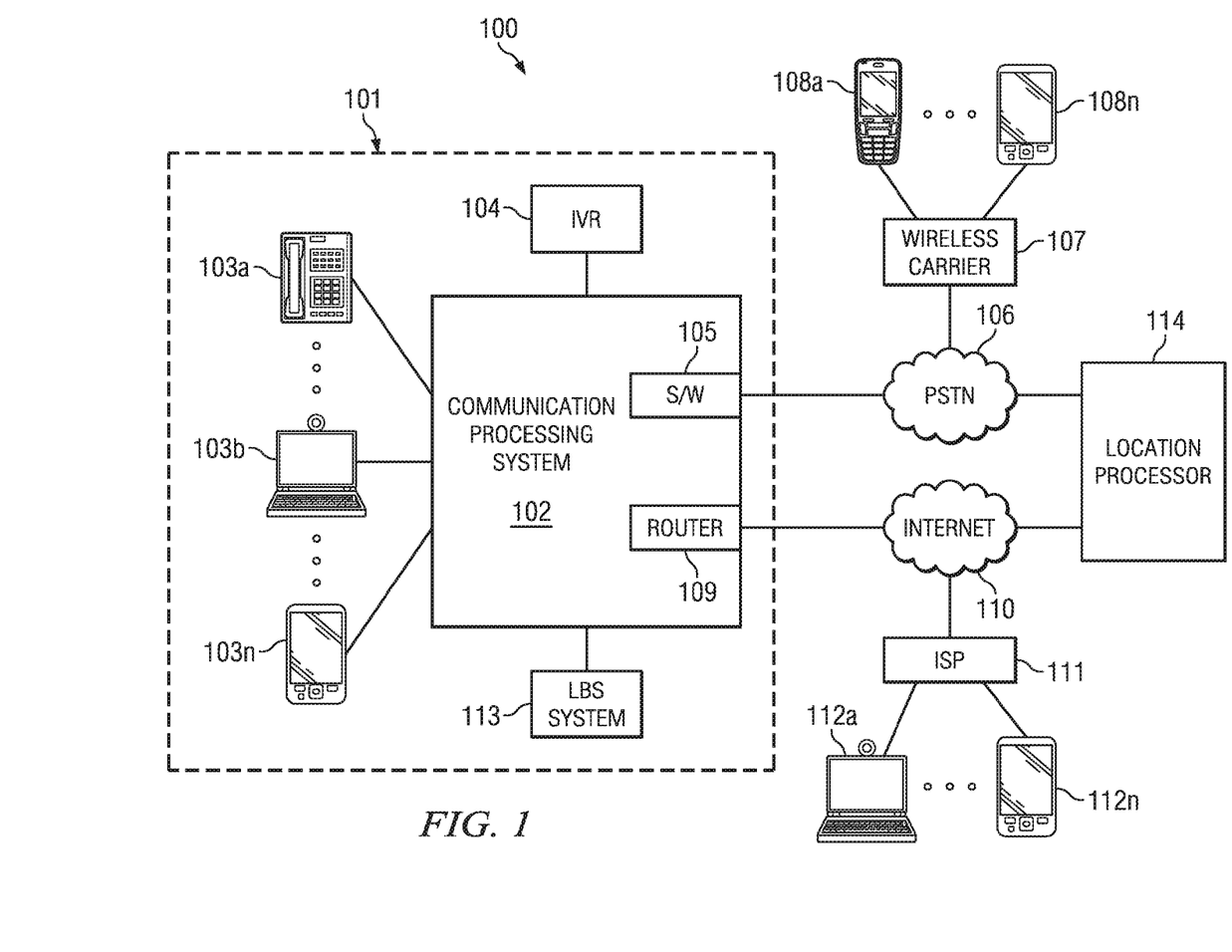
FIG. 1 is a diagram of an environment where a location-based services (LBS) system is deployed within a controlled-environment facility according to some embodiments.

Turning now to FIG. 1, a diagram of environment 100 where location-based services (LBS) system 113 deployed within controlled-environment facility 101 is depicted. A typical resident (e.g., an inmate) of controlled-environment facility 101 (e.g., a jail or prison) may reside within an assigned area (e.g., a jail cell), and may occasionally or periodically be given access to common areas within facility 101. Examples of common areas include, but are not limited to, visitation rooms, cafeteria, kitchen, outdoor/exercise areas, etc. Facility 101 may also include one or more administration areas (e.g., offices, security area(s), information technology (IT) rooms, etc.) generally occupied by prison staff, prison administration, emergency response personnel, law enforcement agents, etc. In some embodiments, one or more of the various areas within facility 101 may be equipped with one or more communication devices 103a-n.

Examples of communication devices 103a-n include, but are not limited to, analog or digital telephones, computing devices, tablets, Voice-over-IP (VOIP) devices, cell phones, video communication or visitation devices, etc. In some cases, these devices may be provided within a pod, module, cell, wing, service kiosk, visitation area, etc. that is generally accessible to inmates. As illustrated, one or more of communication devices 103a-n may be coupled to communication processing system 102, which serves facility 101 and may be configured to provide voice and data services to inmates (and/or prison administration), such as, for example, voice, data, video, Internet access, etc. As shown in FIG. 1, communication processing system 102 may be physically disposed within facility 101. In alternative embodiments, however, one or more of elements of communication processing system 102 may be located outside of facility 101 (e.g., serving two or more distinct facilities).

In various implementations, communication processing system 102 may include conventional wired and/or wireless connectivity options, routing or switching capabilities, analog and digital voice interfaces, etc. For example, communication processing system 102 may be operably coupled to switch 105 and router 109. Particularly, switch 105 may allow communication processing system 102 to establish a remote communication between an inmate operating one of communication devices 103a-n within facility 101 and a non-resident of facility 101 (e.g., a family member, friend, attorney, etc.) operating one or more mobile devices 108a-n outside of facility 101 though Public Switched Telephone Network (PSTN) 106 and via wireless carrier 107. For example, PSTN 106 may include telephone lines, fiber optic cables, microwave transmission links, cellular networks (e.g., third generation (3G), fourth generation (4G), Long Term Evolution (LTE) wireless networks, etc.), communications satellites, undersea telephone cables, switching centers, or the like.

Meanwhile, router 109 allows communication processing system 102 to establish a remote communication between an inmate operating one of communication devices 103a-n within facility 101 and a non-resident of facility 101 (e.g., a family member, friend, attorney, etc.) operating one or more mobile devices 112a-n outside of facility 101 though Internet 110 and via Internet Service Provider 111. For example, Internet 110 may include any computer network or the like employing any suitable communication protocol (e.g., Internet Protocol or "IP" protocol). Moreover, mobile devices 103a-n and/or 112a-n include, but are not limited to, any portable computing devices, tablets, wireless phones, smart phones, mobile video and/or audio communication devices, etc.

Figure 2:
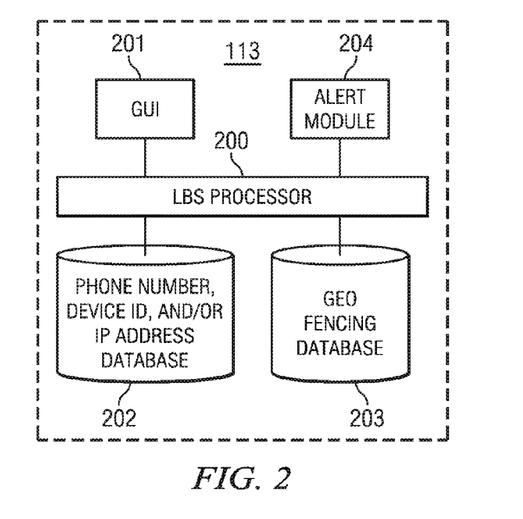
FIG. 2 is a block diagram of an LBS system according to some embodiments.
Figure 3:
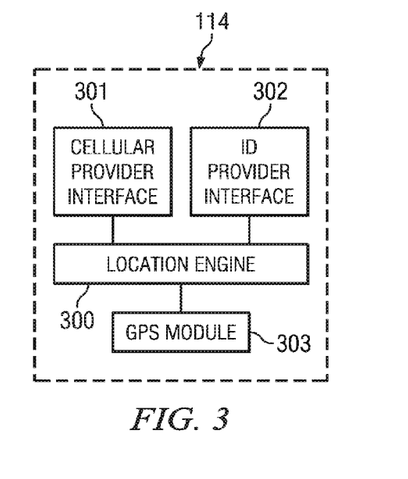
FIG. 3 is a block diagram of a location processor according to some embodiments.

Interactive Voice Response (IVR) system 104 may be configured to generate and play prompts or other messages to inmates and/or non-residents participating in communications through communication processing system 102, and to receive responses from the inmates (e.g., verbally, using Dual-Tone Multi-Frequency or "DTMF" tones, etc.). LBS system 113 may also be operably coupled to communication processing system 102, and one or more elements of LBS system 113 may be located outside of facility 101 (e.g., serving two or more distinct facilities). Location processor 114 may be coupled to PSTN 106, Internet 110, and/or it may be integrated within devices 108a-n, 112a-n, and/or 103a-n. In some implementations, location processor 114 may be at least partially located within facility 101 and/or at least partially integrated within LBS system 113. Illustrative embodiments of LBS system 113 and location processor 114 are shown in FIGS. 2 and 3, respectively, and their operation is described in FIGS. 5-10.

In various embodiments, the systems shown in FIG. 1 may be used to provide location-based services. For example, using location information of wireless, portable, or mobile devices, such as when an inmate calls a cell phone or other wireless device, the systems of FIG. 1 may store and trigger alert events based on the device's physical or geographic location (e.g., latitude/longitude, carrier, cell sector, tower triangulation, Global Positioning System (GPS) coordinates, IP address information, etc.). The physical location information may be used, for example, for law enforcement purposes. For instance, LBS system 113 and/or location processor 114 may be configured to make a positive identification that a phone number is a wireless phone or other portable device, an identification of the carrier providing service to that mobile device, the billing name and address (BNA) registered to the device, the GPS coordinates of the device at the time of a call (longitude and latitude), the cell sector and tower information and triangulation (e.g., if GPS is not available, using closest three wireless towers to GEO fence signal), and IP address of the mobile device, as well as a margin or level of uncertainty of the device's determined physical location.

Using location information, controlled environment facility 101 (or a service provider serving that facility) may be able to make decisions regarding how to handle a call from an inmate, determine whether to connect the call based on distance between the non-resident and the facility, how to rate the call based on cell phone location (e.g., using actual location instead of BNA to arbitrage long distance calls to cell phone numbers), trigger alerts if a call is placed into (or outside of) a pre-determined geographical area, provide interactive investigative tools to show where calls are connecting based on physical location in addition to BNA (e.g., using mapping technology and if warranted or court-ordered), provide real-time location information to law enforcement (such as to find an escapee or a drug smuggling deal), etc.

In some embodiments, LBS system 113 and/or location processor 114 may be configured to enable a called party to opt in/opt out by way of disclaimers at the beginning of communications they receive from inmates, identify called party wireless information, verify that a called party's phone number is a wireless number, identify the called party's wireless carrier, latitude and longitude, BNA, etc. LBS system 113 may also be configured to establish a geo-fence configured to allow calls or deny calls for security reasons, or to trigger alert(s) when the called party's location is within a pre-configured geographic region (i.e., in violation of one or more geo-fence rules). Furthermore, LBS system 113 may be configured to facilitate the creation of Call Detail Records (CDRs), to generate CDR reports reflecting wireless information and easy-to-view interactive map of location and geo-fence information, to implement payment capabilities to charge for the added investigative capabilities logic of geo-fencing, and to map called party coordinates using actual physical or geographic location information.

In some cases, investigators may set up a phone number, an inmate account, a specific phone, a geographical location outside of facility 101, a location within facility 101, or a combination thereof to trigger an alert when used. For instance, when a selected inmate places a phone call and/or when a predetermined mobile device is called, LBS system 113 may trigger an alert to an investigator. The alert may be triggered, for example upon the investigator having established a physical or geographical location to and/or from which the inmate may not communicate. Additionally or alternatively, LBS system 113 may allow a law enforcement officer or investigator to upload a warrant or court order and receive location information real time based on a phone number, IP address, or the like. Additionally or alternatively, a communication may be rated based on true location termination, a decision to either allow or deny a call based on the proximity to the corrections facility, and a mobile device's location may be tracked at the beginning, end, and/or throughout the call to provide driving or moving patterns on a map or the like.

FIG. 2 is a block diagram of LBS system 113 according to some embodiments.

As shown, LBS system 113 includes LBS processor 200 operably coupled to Graphical User Interface (GUI) module 201, alert module 204, phone number, device ID (e.g., Media Access Control or "MAC" address, etc.), and/or IP address database 202, and geo-fencing database 203. In operation, module 200 may receive a request (e.g., from a resident of a facility 101 through communication processing system 102) to establish a remote communication with a mobile device (e.g., 108*a-n* and/or 112*a-n*) operated by a non-resident of the facility and it may allow or deny the request depending, at least in part, upon whether the non-resident has previously provided an authorization to disclose a physical and/or geographical location of the mobile device. For instance, LBS processor 200 may receive the request and consult database 202 to determine whether the called device is a mobile device and/or whether the non-resident registered to that device has provided his or her location tracking authorization. GUI module 201 may be used to allow one or more users to interact with LBS system 200 in order to access databases 202 and/or 203, manage registered devices and/or authorizations, create or modify geo-fencing rules, view alerts, etc. For example, geo-fencing database 203 may include one or more rules that, if violated (e.g., a called number is outside an allowed geographic area and/or within a forbidden area), cause alert module 204 to generate and/or transmit an alert to one or more selected persons (e.g., by phone, email, text message, etc.).

FIG. 3 is a block diagram of location processor 114 according to some embodiments. As illustrated, location processor 114 includes location engine 300 operably coupled to cellular provider interface 301, IP provider interface 302, and GPS module 303. In operation, location processor 114 may receive an instruction, message, or command from LBS processor 200 requesting the physical location of a given one of devices 103*a-n*, 108*a-n*, and/or 112*a-n*. If the device is being served by wireless carrier 107, then cellular provider interface 301 may be used to query wireless carrier 107 for physical information of the device (e.g., cell ID, sector ID, etc.). Conversely, if the device is being served by ISP 111 (e.g., over a wired or wireless connection), then IP provider interface 302 may be used to query ISP 111 for physical information of the device (e.g., IP address, etc.). In some embodiments, elements of location processor 114 may be at least in part integrated into devices 103*a-n*, 108*a-n*, and/or 112*a-n*, in which case GPS module 303 may provide the device's coordinates (i.e., latitude and longitude). When receiving latitude and longitude directly from providers 107 and/or 111, the location processor 114 may identify range of accuracy or margin of uncertainty, for example, based on carrier type and available information. For instance, tier 1 carriers may provide an exact latitude and longitude accurate within a couple meters, whereas for non-tier 1 carriers the accuracy may be within ~2 miles (e.g., if the technology is based on three closest cell towers or the like). Upon retrieving the physical location information through one or more of modules 301-303, location engine 300 may fulfill the original request and transmit the device's location information to LBS processor 200.

In some embodiments, the modules or blocks shown in FIGS. 2 and 3 may represent processing circuitry and/or sets of software routines, logic functions, and/or data structures that, when executed by a processor, perform specified operations. Although these modules are shown as distinct logical blocks, in other embodiments at least some of the operations performed by these modules may be combined into fewer blocks. For example, in some cases, database 202 may be combined with database 203. Conversely, any given one of modules 201-204 and/or 301-303 may be implemented such that its operations are divided among two or more logical blocks. Although shown with a particular configuration, in other embodiments these various modules or blocks may be rearranged in other suitable ways.

Figure 4:
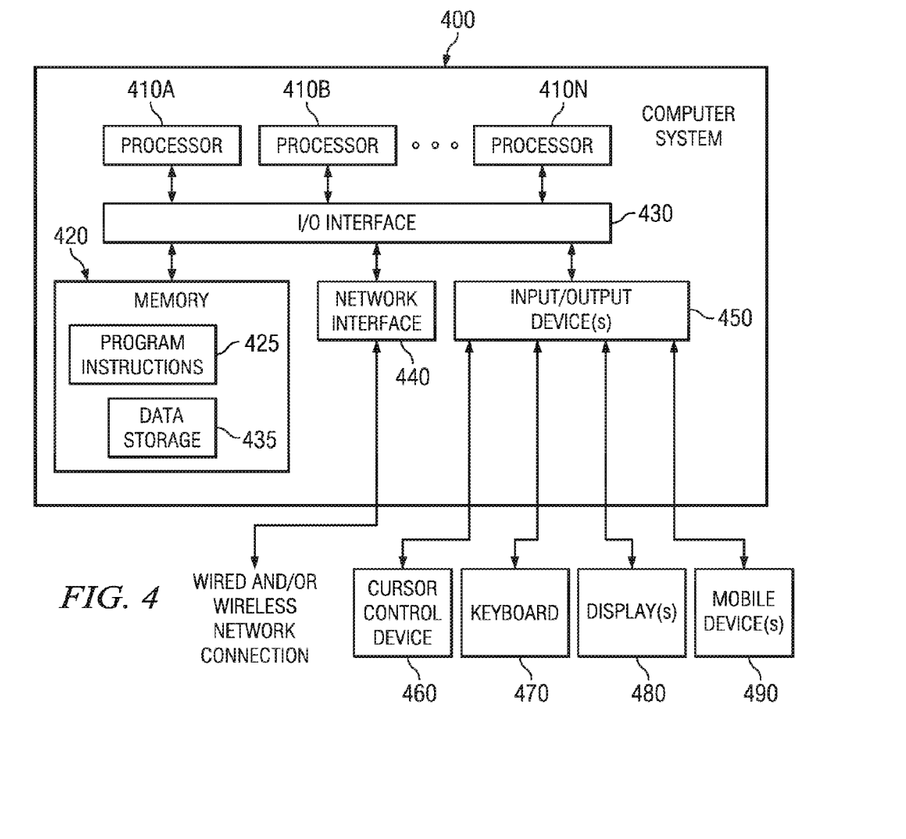
FIG. 4 is a block diagram of a computer system configured to implement various systems and methods described herein according to some embodiments.

As noted above, embodiments of systems and methods for developing, deploying, providing, and/or operating location-based services for controlled-environment facilities may be implemented or executed by one or more computer systems. One such system is illustrated in FIG. 4. In various embodiments, system 400 may be a server, a workstation, a desktop computer, a laptop, a tablet computer, a mobile device, a smart phone, or the like. In some cases, system 400 may be used to implement communication system 102, LBS system 113, location processor 114, and/or one or more of devices 103*a-n*, 108*a-n*, and/or 112*a-n*. For example, devices 103*a-n*, 108*a-n*, and/or 112*a-n* may be implemented as dedicated processor-based, electronic devices similar to computer system 400. Additionally or alternatively, devices 103*a-n*, 108*a-n*, and/or 112*a-n* may be implemented as integrated components of computer system 400 (e.g., as part of a tablet computing device or the like).

As illustrated, computer system 400 includes one or more processors 410A-N coupled to a system memory 420 via an input/output (I/O) interface 430. Computer system 400 further includes a network interface 440 coupled to I/O interface 430, and one or more input/output devices 450, such as cursor control device 460, keyboard 470, display(s) 480, or mobile device(s) 490. Other devices may include, for example, surveillance cameras, microphones, antennas/wireless transducers, phone detection modules, etc. In some embodiments, each of communication system 102, LBS system 113, location processor 114, and/or one or more of devices 103*a-n*, 108*a-n*, and/or 112*a-n* may be implemented using a single instance of computer system 400, while in other embodiments multiple such systems, or multiple nodes making up computer system 400, may be configured to host different portions of a given electronic device or system.

In various embodiments, computer system 400 may be a single-processor system including one processor 410, or a multi-processor system including two or more processors 410 (e.g., two, four, eight, or another suitable number). Processors 410 may be any processor capable of executing program instructions. For example, in various embodiments, processors 410 may be general-purpose or embedded processors implementing any of a variety of instruction set architectures (ISAs), such as the x86, PowerPC®, ARM®, SPARC®, or MIPS® ISAs, or any other suitable ISA. In multi-processor systems, each of processors 410 may commonly, but not necessarily, implement the same ISA. Also, in some embodiments, at least one processor 410 may be a graphics processing unit (GPU) or other dedicated graphics-rendering device.

System memory 420 may be configured to store program instructions and/or data accessible by processor 410. In various embodiments, system memory 420 may be implemented using any suitable memory technology, such as static random access memory (SRAM), synchronous dynamic RAM (SDRAM), nonvolatile/Flash-type memory, or any other type of memory. As illustrated, program instructions and data implementing certain operations such as, for example, those described below in connection with FIGS. 5-10, may be stored within system memory 420 as program instructions 425 and data storage 435, respectively. In other embodiments, program instructions and/or data may be received, sent or stored upon different types of computer-accessible media or on similar media separate from system memory 420 or computer system 400. Generally speaking, a computer-accessible medium may include any tangible storage media or memory media such as electronic, magnetic, or optical media—e.g., disk or CD/DVD-ROM coupled to computer system 400 via I/O interface 430. Program instructions and data stored on a tangible computer-accessible medium in non-transitory form may further be transmitted by transmission media or signals such as electrical, electromagnetic, or digital signals, which may be conveyed via a communication medium such as a network and/or a wireless link.

In one embodiment, I/O interface 430 may be configured to coordinate I/O traffic between processor 410, system memory 420, and any peripheral devices in the device, including network interface 440 or other peripheral interfaces, such as input/output devices 450. In some embodiments, I/O interface 430 may perform any necessary protocol, timing or other data transformations to convert data signals from one component (e.g., system memory 420) into a format suitable for use by another component (e.g., processor 410). In some embodiments, I/O interface 430 may include support for devices attached through various types of peripheral buses, such as a variant of the Peripheral Component Interconnect (PCI) bus standard or the Universal Serial Bus (USB) standard, for example. In some embodiments, the function of I/O interface 430 may be split into two or more separate components, such as a north bridge and a south bridge, for example. In addition, in some embodiments some or all of the functionality of I/O interface 430, such as an interface to system memory 420, may be incorporated directly into processor 410.

Network interface 440 may be configured to allow data to be exchanged between computer system 400 and other devices attached to a network, such as other computer systems, or between nodes of computer system 400. In various embodiments, network interface 440 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 450 may, in some embodiments, include one or more display terminals, keyboards, keypads, touchpads, scanning devices, voice or optical recognition devices, mobile devices, or any other devices suitable for entering or retrieving data by one or more computer system 400. Multiple input/output devices 450 may be present in computer system 400 or may be distributed on various nodes of computer system 400. In some embodiments, similar input/output devices may be separate from computer system 400 and may interact with one or more nodes of computer system 400 through a wired or wireless connection, such as over network interface 440.

As shown in FIG. 4, memory 420 may include program instructions 425, configured to implement certain embodiments described herein, and data storage 435, comprising various data may be accessible by program instructions 425. In an embodiment, program instructions 425 may include software elements of embodiments illustrated in the above figures. For example, program instructions 425 may be implemented in various embodiments using any desired programming language, scripting language, or combination of programming languages and/or scripting languages (e.g., C, C++, C#, Java™, JavaScript™, Perl, etc.). Data storage 435 may include data that may be used in these embodiments (e.g., recorded communications, profiles for different modes of operations, etc.). In other embodiments, other or different software elements and data may be included.

A person of ordinary skill in the art will appreciate that computer system 400 is merely illustrative and is not intended to limit the scope of the disclosure described herein. In particular, the computer system and devices may include any combination of hardware or software that can perform the indicated operations. In addition, the operations performed by the illustrated components may, in some embodiments, be performed by fewer components or distributed across additional components. Similarly, in other embodiments, the operations of some of the illustrated components may not be provided and/or other additional operations may be available. Accordingly, systems and methods described herein may be implemented or executed with other computer system configurations.

In some embodiments, the various systems described above may operate such that, when an inmate places a remote communication through communication processing system 102, a lookup may be performed (e.g., by LBS system 113 and/or location processor 114) into a web service that identifies that the remote communication is to a cell phone or other mobile device, acquire and store the related information, and make a decision if the remote communication is allowed to be connected or not. For example, a first web service call may be used for determining if the remote communication is to a cell phone or mobile device and providing the related information, and a second web service call may be used to gather and process any geo-fencing rules. Moreover, these service calls may be performed in real-time or near real-time. In some cases, LBS system 113 and/or location processor 114 may be able to process special numbers if configured as geo-fence exempt. Also, LBS system 113 may play appropriate audio messages to the called party and track their acceptance to the terms and conditions (e.g., through IVR system 104) to receiving a call from (or placing a call to) an inmate at a facility that has geo-fencing enabled.

Figure 5:
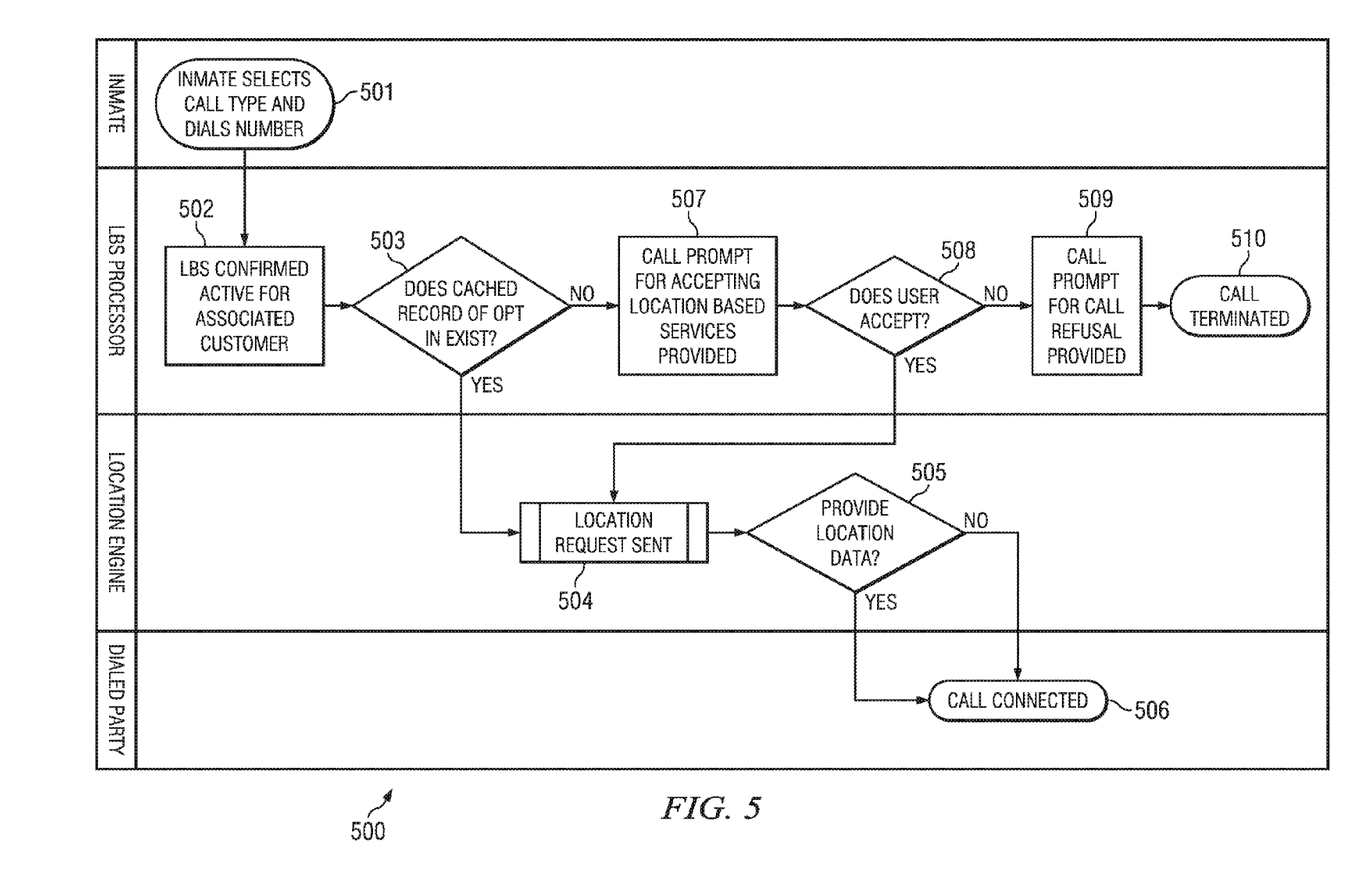
FIG. 5 is a flowchart of a method of LBS call processing according to some embodiments.

FIG. 5 is a flowchart of method 500 of LBS call processing. In some embodiments, method 500 may be performed, at least in part, by LBS system 113 of FIG. 1. As illustrated, at block 501, method 500 may allow an inmate of facility 101 to select a remote communication type (e.g., PSTN, VoIP, etc.) and dial a phone number or otherwise select a mobile device of a non-resident (e.g., using the non-resident's name, username, email address, device ID, MAC address, etc.). This operation may be implemented, for example, via IVR system 104 or the like. At block 502, LBS processor 113 may confirm that LBS services are active for the associated facility 101 or the associated non-resident. For example, LBS system 113 may inspect database 202 and determine that the called device is in fact a mobile device. Additionally or alternatively, LBS system 113 may query location processor 114 to make this determination. At block 503, method 500 may identify whether there exists a record of a previous authorization or consent by the non-resident to have the physical or geographic location of his or her mobile device tracked by facility 101 (e.g., by consulting database 202).

At block 504, if a previous and non-expired authorization is found, LBS system 113 and/or location processor 114 may transmit a request for the mobile device's location information (e.g., to carrier 107, ISP 111, and/or via GPS module 303). At block 505, method 500 determines whether the queried entity (e.g., carrier 107, ISP 111, etc.) was able to provide the location information. In some embodiments, regardless of the outcome of 505, the remote communication is established at block 506. However, if the location information is available, LBS system 113 may also be configured to add that information to a CDR created for that communication. Also, in other embodiments, the communication may be denied if the location information is not available (e.g., in situations involving high-risk inmates and/or non-residents).

At block 507, if a previous and current authorization is not found, LBS system 113 and/or location processor 114 may provide the non-resident with a prompt for accepting LBS services (e.g., via IVR system 104). If the non-resident agrees at block 508, control passes to block 504. Otherwise, a call prompting refusing to establish the remote communication may be provided at block 509, and the communication may be terminated at block 510.

In some embodiments, LBS system 113 may allow users to specify a phone number as "covert monitor" without providing consent to the called party and/or without the called party even operating the device or receiving a call. This feature may be useful, for example, if facility 101 is required by a court order or warrant to track a called party's cell phone number regardless of that party receiving or placing a call to or from an inmate. Moreover, LBS system 113 may include "send to phone" capabilities that forward the location coordinates of a violating communication to an investigator's cell phone (e.g., via text message or email) with mapping information.

Figure 6:
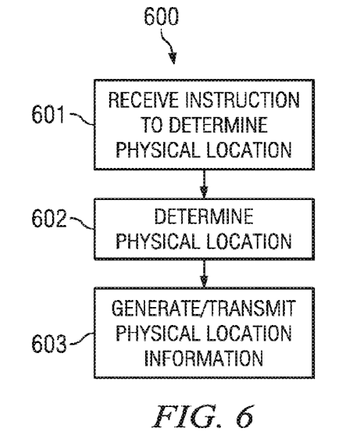
FIG. 6 is a flowchart of a method of determining a mobile device's physical location according to some embodiments.

FIG. 6 is a flowchart of a method of determining a mobile device's physical location. In some embodiments, method 600 may be performed, at least in part, by location processor 114 of FIG. 1. As illustrated, at block 601, method 600 may receive an instruction (e.g., as a web service call from LBS system 113) to determine a physical location of a particular mobile device. At block 602, location processor 114 may issue a query to at least one or more carriers 107, ISP 111, and/or GPS 303 to retrieve the requested information. For example, in some cases, the instruction may include an electronic authorization given by the non-resident operator of the mobile device, which may in turn allow carrier 107 or ISP 111 to provide the device's location information to location processor 114. A carrier may track the physical location of mobile device using GPS, an E911 system, cell tower triangulation, or other system. At block 603, location processor 114 may generate and/or transmit physical or geographic location information to LBS system 113. In some embodiments, location processor 114 may further determine, calculate, or estimate a margin of uncertainty associated with the location information depending upon the source of the information (e.g., by type of carrier, etc.) and transmit that additional information to LBS system 113.

Figure 7:
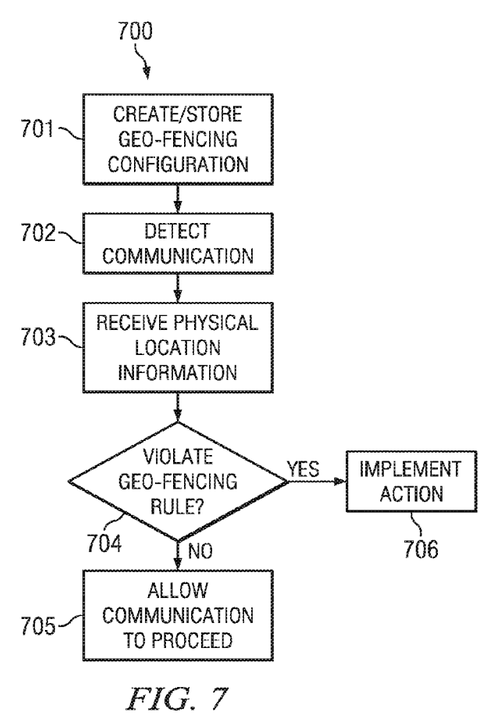
FIG. 7 is a flowchart of a geo-fencing enforcement method according to some embodiments.

FIG. 7 is a flowchart of geo-fencing enforcement method 700. In some embodiments, method 700 may be implemented, at least in part, by LBS system 113 of FIG. 1. As shown, at block 701, method 700 may create or store geo-fencing configurations implemented by a controlled-environment facility. For instance, LBS system 113 may allow a user (e.g., prison staff, investigator, etc.) to access and/or manage geo-fencing database 203 via GUI module 201. Examples of screenshots that may be generated by GUI module 201 are discussed in FIGS. 8-10 below. At block 702, method 700 may detect a request for a remote communication. Such a request may have been initiated by an inmate and/or non-resident of facility 101. At block 703, LBS system 113 may receive physical or geographic location information, for example, in response to an instruction sent to location processor 114.

At block 704, method 700 may determine whether the location information violates or is in compliance with applicable geo-fencing rule(s). Examples of geo-fencing rules include, but are not limited to, one or more areas to which an inmate is not allowed to call (or receive calls), or one or more areas to which an inmate is allowed to call (or receive calls) to the exclusion of other area(s). These rules may be inmate, non-resident, type of communication (e.g., cellular vs. IP), and/or device specific. Moreover, in some cases, LBS system 113 may specify a phone number as a "multi-track" (or "continuous-track") number, which may gather location information several times throughout a remote communication instead of just at the beginning or end of the communication.

Furthermore, physical or geographic areas may be defined in a linear fashion (e.g., west/east of a given longitude or north/south of a given latitude), a circular fashion (e.g., latitude and longitude of a center point plus a radius), by Zone Improvement Plan (ZIP), by area code, by city, county, state, etc. For example, LBS system 113 may allow for authorized called party phone numbers to be configured to not disconnect if within geo-fence proximity, so as to allow calls to that number no matter how close they are to facility 101. If in compliance, LBS system 113 may allow the remote communication to be established and/or to continue. Otherwise, LBS system 113 may take corrective action. Examples of corrective action include, but are not limited to, terminating the remote communication, recording the communication, providing a live-monitoring feed of the communication to an investigator or prison staff, etc.

In various embodiments, GUI module 201 of LBS system 113 may provide a user interface to authorized users (e.g., investigative staff or the like). Such an interface may allow a user to view, create, and edit geo-fencing rules, call detail records, mapped location information, margins of uncertainty, etc. For example, GUI module 201 may be configured to report on related calls within a selectable proximity to one or more areas, to display one or more CRDs on a geographic map, to display a correlation between a device's BNA and physical location, etc. GUI module 201 may also allow authorized users to take predetermined actions and to receive real time information through the web service outside of any current call in progress. For example, assume an inmate calls a non-resident party at a given time. The called party's latitude and longitude puts the called party at a murder scene at the same time as the inmate phone call.

Sometime later, the investigator may wish to know where the called party, who is a suspect in the murder case, is located. As such, the investigator may take an action via GUI module 201 to receive the desired location information of the called party, which may or may not require a warrant or court order. In some embodiments, ad hoc queries of LBS system 113 may have their own security privileges so they require a higher level of authorization and may be tracked for transactional reporting purposes, transactional billing purposes, and overall usage reporting purposes.

Figure 9:
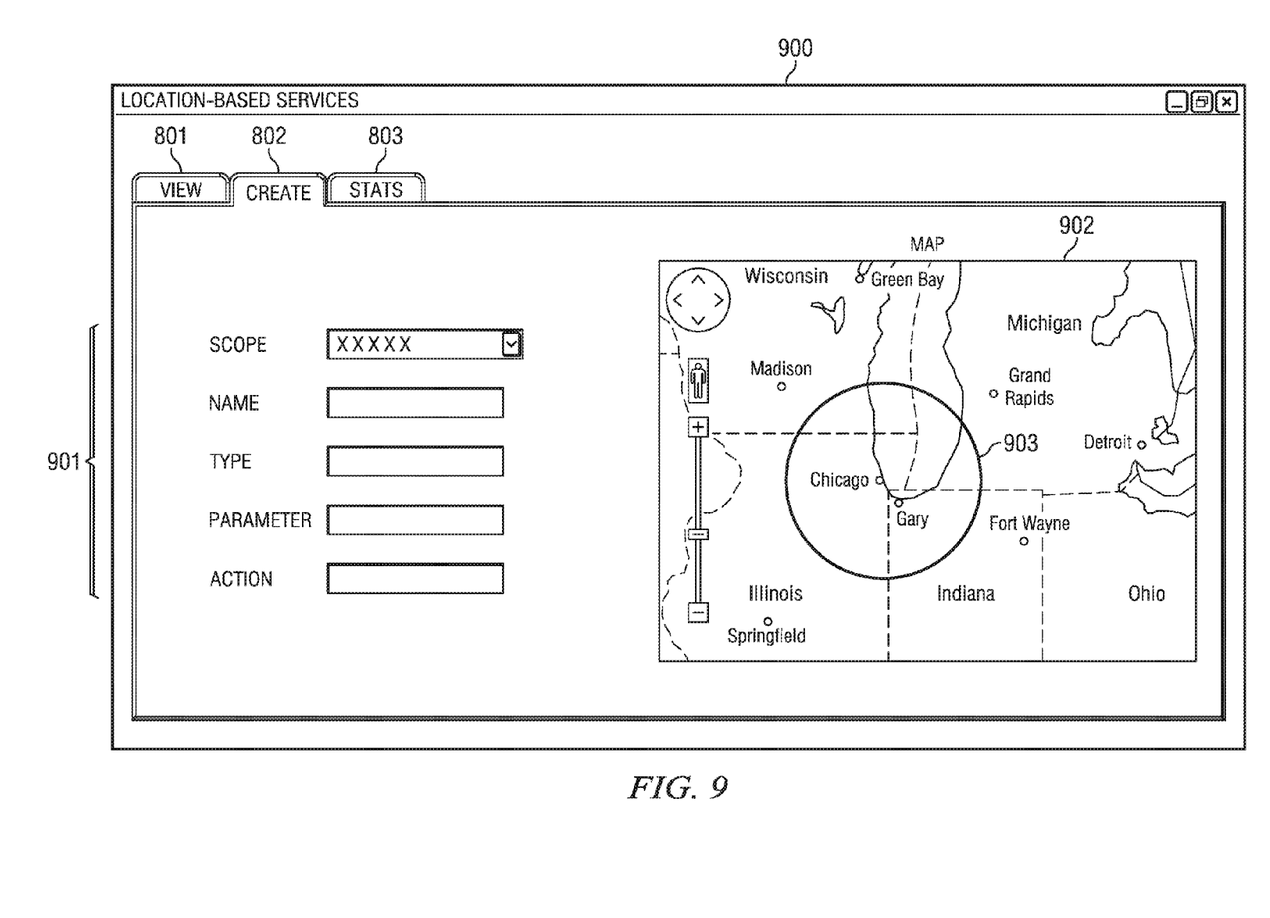
Figure 10:
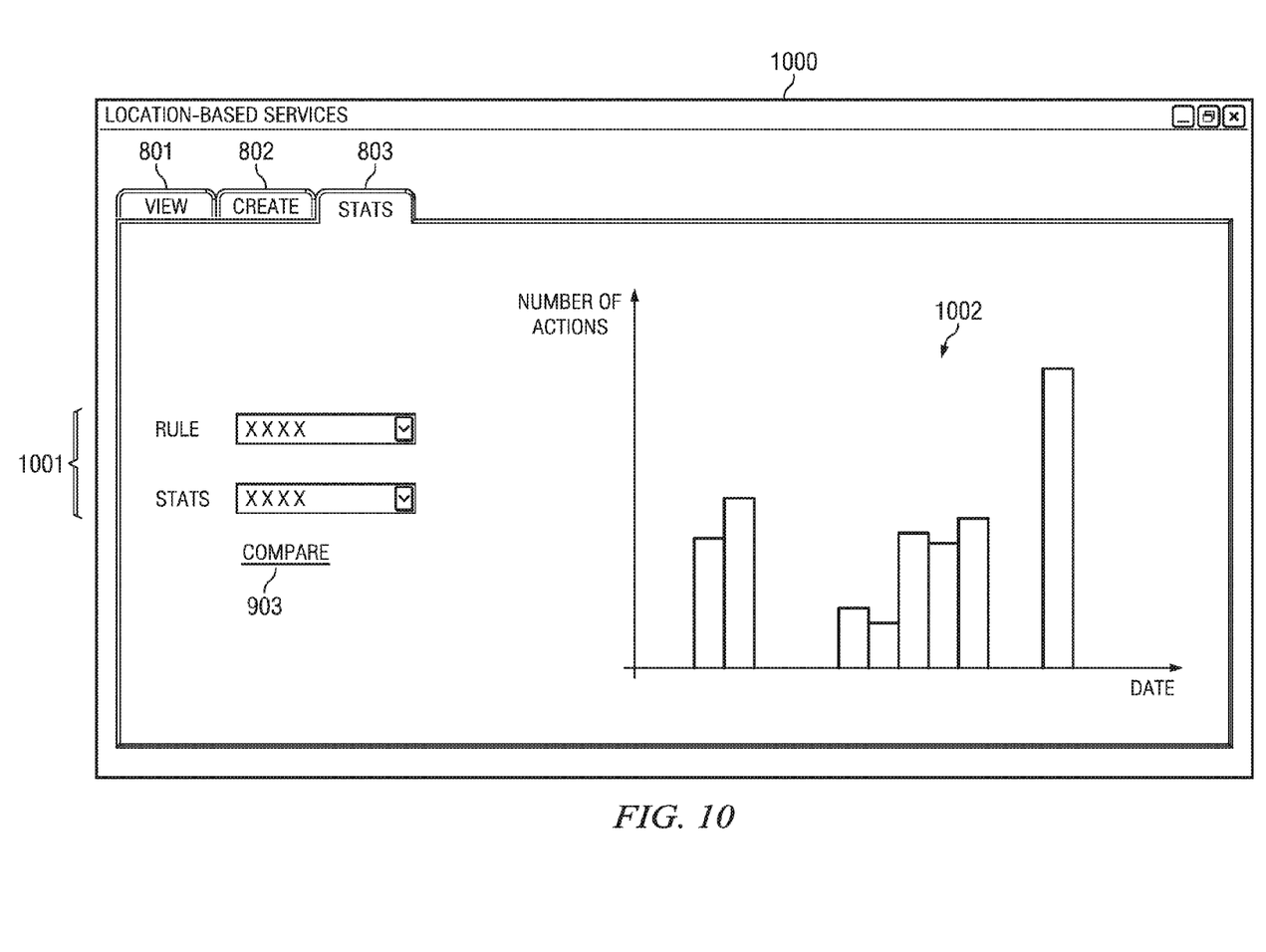

FIGS. 8-10 are rendered screenshots 800-1000 of an LBS software application that may be produced by GUI module 201 according to some embodiments. In various implementations, the software application may be cloud or web-based, although in other implementations the application may be a stand-alone, executable program. As illustrated, three "tabs" 801-803 provide an authorized user with viewing, creation, and statistics options. Particularly with respect to FIG. 8, "view" tab 801 is selected, thus allowing a user to view outstanding geo-fencing rules. These rules may be facility-wide rules 804, as well as rules that are applicable to individual inmates or groups of inmates (e.g., known gangs, etc.) 805. For example, for each rule stored in database 203, one or more of the following information may be provided: the name of the rule, the status of the rule (e.g., enabled or disabled), the type of rule (e.g., circular, ZIP, etc.), one or more parameters associated with the rule (e.g., radius, etc.), whether the rule is positively or negatively defined (i.e., whether a mobile device may receive a call if within a selected area or if outside of that area, respectively), etc. Other information may include a number of geo-fencing rule violations associated with each rule, CDRs for each violation, etc. Also, still referring to FIG. 8, a map portion 806 of screenshot 800 may provide a geographic indication of the geographic rule selected in portions 804 and/or 805. Upon selection of a rule, map 806 may render location information for communication(s) associated with each rule violation, for example.

In FIG. 9, screenshot 900 shows "create" tab 802 selected by a user, thus allowing the user to enter or edit one or more fields for one or more geo-fencing rules. For example, the user may select a scope of the rule (e.g., facility-wide, for a group of inmates, for an individual inmate, etc.), as well as a name of the rule, a type of rule (e.g., circular, etc.), one or more rule parameters, and one or more actions (e.g., alerts, etc.) to be taken in response to a violation of that rule. Examples of rule information that may be added to any given rule may include, but are not limited to, a description of the rule; a status of the rule (e.g., active, inactive, etc.); an address, city, state, ZIP code, latitude, longitude, radius, diameter, length, or measurement or a region associated with the rule; a start time, start date, end time, and end date for the rule; an identification of a person or persons who created the rule and its date of creation; the name of an author or authors of one or more previous rule modification and the date of such modifications; an indication of whether the rule is private or shared; etc. As shown, map portion 902 may automatically represent region 903 covered by the geo-fencing rule overlaid upon a geographic map. Furthermore, the size, type, and location of region 903 may be updated continuously and/or in response to a modification of fields 901. In some cases, the map may be interactive and the investigator may manipulate or pinpoint the locations on the map in order to generate or create the geo-fencing rule, thus automatically updating the rule displayed in information portion 901.

In FIG. 10, screenshot 1000 shows "statistics" tab 803 selected by a user, thus enabling the user to obtain information regarding the execution of one or more geo-fencing rules. For example, the user may select one or more rules and desired statistics at 1001, and a corresponding graph 1002 may be rendered. Examples of statistics include, but are not limited to, a number of call terminations, a number of alerts issued, a number of live-monitoring events, a number of recording events, etc. These statistics may be presented by date, time, inmate, non-resident, phone number or device ID, etc. In some embodiments, a "compare" button or hyperlink 903 may allow the user to combine statistics of two or more rules on a single graph (e.g., in different colors), for example. Also, the user may select one or more elements on graph 1002 to display a map, similar to maps 806 and 902, and showing CDRs with location information for one or more calls affected by the selected rule(s).

It should be noted that, although the examples shown in FIGS. 8-10 describe a user interface based on "tabs," other implementation may utilize any other suitable navigational or operational tools. For example, in other embodiments, GUI module 201 may provide user interface(s) based upon one or more menus (e.g., hierarchical menus), hyperlinks, web pages, worksheets, buttons, etc. More generally, it should be understood that the screenshots of FIGS. 8-10 are presented only by way of illustration, and not limitation.

Figure 11:
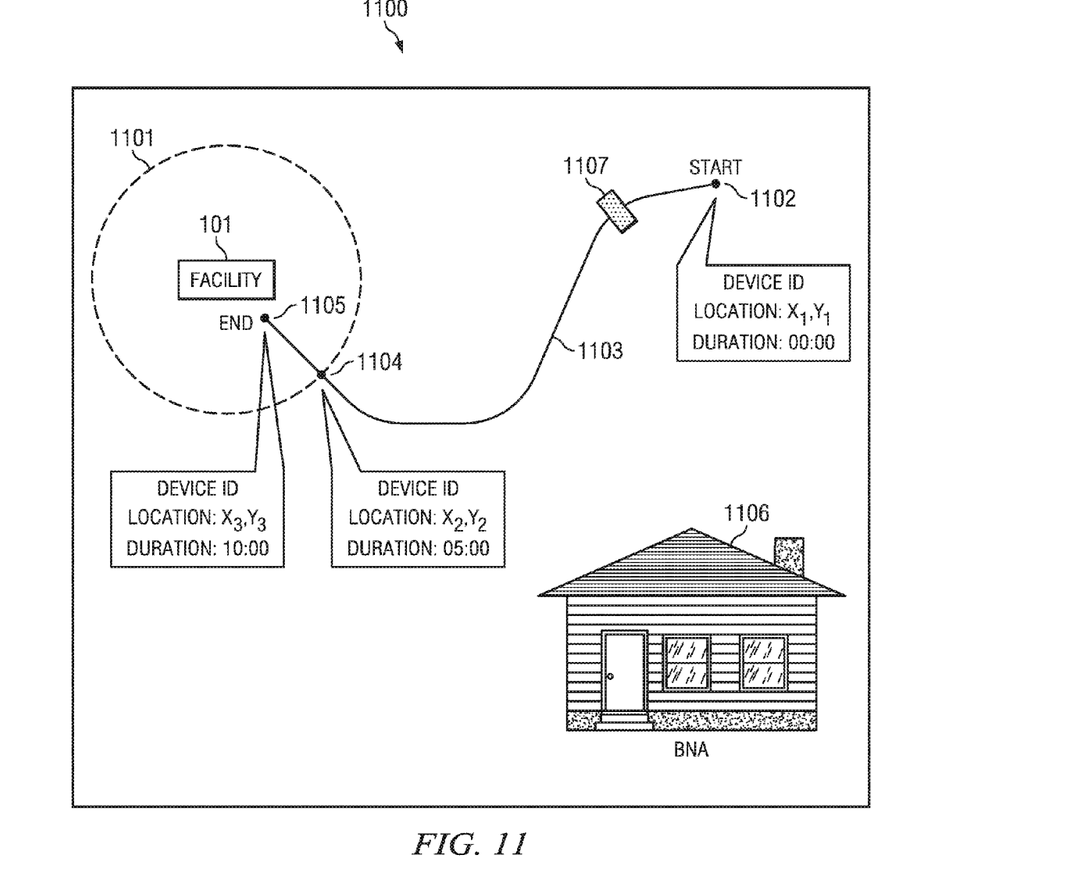

FIG. 11 shows screenshot 1100 illustrating an example of a map according to some embodiments. Specifically, facility 101 may be shown along region 1101 depicting a predetermined geo-fencing rule (i.e., some corrective action is invoked if the called party is within region 1101). In this example, a non-resident party receives or initiates a call with a mobile device at a starting position 1102. Along with point 1102, this mapping feature may also display a dialog box that indicates the device ID or called party ID, the calling party ID, the actual physical or geographic location of the mobile device, and the duration of the call at that point (i.e., 00:00 in this case). The dialog box may also indicate the physical distance between point 1102 and facility 101 and/or region 1101, as well as the physical distance between point 1102 and a BNA information associated with the mobile device 1106.

As the communication progresses, the map feature(s) of FIG. 11 may render trajectory 1103 of the mobile device as the non-resident party physically moves. In this example, at point 1104 (at time stamp 05:00), the mobile device violates the geo-fencing rule of region 1104 and some corrective action may be selected (e.g., the call may trigger an alert to be recorded, monitored, terminated, etc.). At point 1105 (at time stamp 10:00), the called or calling party may terminate the call (e.g., voluntarily). In some embodiments, sliding cursor 1107 may allow an investigator to retrace trajectory 1103 and determine at what location the non-resident party was during what point of the call. In cases the call is recorded, for instance, the cursor may be synchronized with the audio recording to facilitate review. As an example, if the non-resident picks another party up at some point on the way to facility 101, synchronized review allows an investigator to identify when and where such an event took place. In some cases, when the investigator replays the recording, sliding cursor 1107 may move along trajectory 1103. Additionally or alternatively, sliding cursor 1107 may be used to pause, rewind or forward the audio recording.

Dialog boxes with aforementioned call information may be displayed at predetermined points of trajectory 1103 and/or may be displayed with cursor 1107. In various embodiments, the map feature(s) of FIG. 11 may be displayed in real-time, as the call or communication progresses. Additionally or alternatively, the map feature(s) may be stored as part of a CDR or the like. As such, these feature(s) may allow the display of true call termination on a map, in addition to the facility address location and the BNA location. This may provide a full picture of where the call came from, where it terminated to, and/or the address it is registered to. It may also help law enforcement by providing not only the called parties home address, but where they were at the time of the call. Additionally, it may tell law enforcement where a non-resident as in proximity to the correctional facility as well as where he or she was in proximity to their home address (e.g., if law enforcement needs to set up a sting operation or the like).

The various systems and methods illustrated in the figures and described herein represent example embodiments of systems and methods for location-based services for controlled-environment facilities. These techniques may be implemented in software, hardware, or a combination thereof. The order in which each operation of a given method is performed may be changed, and various elements of the systems illustrated herein may be added, reordered, combined, omitted, modified, etc. Various modifications and changes may be made as would be clear to a person of ordinary skill in the art having the benefit of this specification. It is intended that the invention(s) described herein embrace all such modifications and changes and, accordingly, the above description should be regarded in an illustrative rather than a restrictive sense.

The invention claimed is:

1. A method, comprising:
   performing, by one or more computer systems:
   receiving, from a resident of a controlled-environment facility, a request to establish a remote communication with a mobile device operated by a non-resident of the controlled-environment facility;
   receiving location information relating to the mobile device from at least one of a communication service provider and a Global Positioning System receiver;
   determining, based on the received location information, a physical location of the mobile device at the time of the request for the remote communication;
   allowing the request for the remote communication depending, at least in part, upon the determined physical location of the mobile device; and
   monitoring the physical location of the mobile device during the allowed remote communication.

2. The method of claim 1, wherein the physical location of the mobile device is monitored continuously during the allowed remote communication.

3. The method of claim 1, wherein the physical location of the mobile device is monitored repeatedly during the allowed remote communication.

4. The method of claim 1, wherein the monitoring comprises determining whether the physical location of the mobile device is within a defined geographical area.

5. The method of claim 4, wherein the geographic area comprises the location of the controlled-environment facility.

6. The method of claim 1, further comprising:
   performing, by the one or more computer systems:
   generating a notification depending, at least in part, upon the monitored physical location of the mobile device during the allowed remote communication.

7. The method of claim 4, further comprising:
   performing, by the one or more computer systems:
   issuing one or more alerts, if based on the monitoring of the physical location of the mobile device, the mobile device is determined to have moved into or out of the defined geographic area during the allowed remote communication.

8. The method of claim 4, further comprising:
   performing, by the one or more computer systems:
   terminating the allowed remote communication, if based on the monitoring of the physical location of the mobile device, the mobile device is determined to have moved into the defined geographic area during the allowed remote communication.

9. The method of claim 1, further comprising:
   performing, by the one or more computer systems:
   allowing a user of the one or more computer systems to monitor the allowed remote communication based at least in part on the monitored physical location of the mobile device.

10. The method of claim 4, further comprising:
    performing, by the one or more computer systems:
    displaying a representation of a physical location of the mobile device on a geographic map during the allowed remote communication; and
    updating the representation of the physical location of the mobile device on the geographic map in response to detected movement in the physical location of the mobile device during the allowed remote communication.

11. The method of claim 10, wherein the representation of the physical location of the mobile device further comprises a representation of movement of the mobile device within the geographic map.

12. The method of claim 10, wherein the representation of the physical location of the mobile device further comprises a representation of a proximity of the physical location of the mobile device to the defined geographic area, wherein the defined geographic area is at least partially within the geographic map.

13. The method of claim 11, further comprising:
    performing, by the one or more computer systems:
    allowing a user of the one or more computer systems to monitor the allowed remote communication based at least in part on the monitored physical location of the mobile device, wherein the allowed remote communication monitored by the user is synchronized with the representation of the movement of the mobile device within the geographic map.

14. A system for providing location-based services for controlled-environment facilities, the system comprising:
    a processor; and
    a memory coupled to the processor, the memory storing computer-readable instructions that, upon execution by the processor, cause the system to:
    receive, from a resident of a controlled-environment facility, a request to establish a remote communication with a mobile device operated by a non-resident of the controlled-environment facility;
    receive location information relating to the mobile device from at least one of a communication service provider and a Global Positioning System receiver;
    determine, based on the received location information, a physical location of the mobile device at the time of the request for the remote communication;
    allow the request for the remote communication depending, at least in part, upon the determined physical location of the mobile device; and monitor the physical location of the mobile device during the allowed remote communication.

15. The system of claim 14, wherein the physical location of the mobile device is monitored continuously during the allowed remote communication.

16. The system of claim 14, wherein the physical location of the mobile device is monitored repeatedly during the allowed remote communication.

17. The system of claim 14, wherein monitoring the physical location comprises determining whether the physical location of the mobile device is within a defined geographical area.

18. The system of claim 17, wherein the geographic area comprises the location of the controlled-environment facility.

19. The system of claim 17, the computer-readable instructions further causing the system to:
  issue one or more alerts, if based on the monitoring of the physical location of the mobile device, the mobile device is determined to have moved into or out of the defined geographic area during the allowed remote communication.

20. The system of claim 14, the computer-readable instructions further causing the system to:
  generate a notification depending, at least in part, upon the monitored physical location of the mobile device during the allowed remote communication.

* * * * *